_United States Patent Office_

3,253,034
Patented May 24, 1966

3,253,034
AMINO-PHENYLETHANOLS
Bernard Joseph McLoughlin, Macclesfield, England, assignor to Imperial Chemical Industries Limited, London, England, a corporation of Great Britain
No Drawing. Filed Dec. 3, 1962, Ser. No. 241,469
Claims priority, application Great Britain, Dec. 22, 1961,
46,035/61
5 Claims. (Cl. 260—570.6)

This invention relates to aromatic compounds and more particularly it relates to benzene derivatives which possess valuable therapeutic properties for example they possess $\beta$-adrenergic blocking activities.

It is known that certain benzene derivatives for example 1-(3:4-dichlorophenyl)-2-isopropylaminoethanol possess $\beta$-adrenergic blocking activity but they suffer from the disadvantage that they also act as sympathomimetic agents and in particular they stimulate heart muscle.

We have now found that related benzene derivatives for example 1-(2-chloro-4-methylphenyl)-2-isopropylaminoethanol,
1-(2-chloro-5-methylphenyl)-2-isopropylaminoethanol and
1-(2-chloro-4-methylphenyl)-2-t-butylaminoethanol possess $\beta$-adrenergic blocking activity but they do not possess any sympathomimetic activity and are thus valuable therapeutic agents.

Thus according to the invention we provide benzene derivatives of the formula:

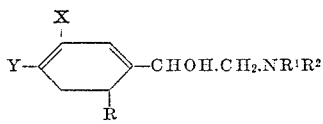

wherein R stands for a halogen atom, wherein of the substituents X and Y, one stands for hydrogen or for an alkyl or an alkoxy radical and the other stands for an alkyl or an alkoxy radical, wherein $R^1$ stands for hydrogen or for a lower alkyl radical and wherein $R^2$ stands for an alkyl radical containing at least two carbon atoms, optionally substituted, and the pharmaceutically-acceptable salts thereof.

The substituent $R^1$ may be for example a methyl, ethyl, propyl or butyl radical.

The substituent $R^2$ may be for example a straight or branched chain alkyl radical containing not more than 10 carbon atoms for example an ethyl, n-propyl, isopropyl, s-butyl, isobutyl, t-butyl or pentyl radical. The substituent $R^2$ may be optionally substituted for example by an aryl radical, such as a phenyl radical, or by one or more hydroxyl radicals.

The substituent R may be for example a chlorine or bromine atom and the substituents X and Y, which may be the same or different, may be for example methyl, ethyl, methoxy or ethoxy radicals.

As particularly useful compounds there may be mentioned for example 1-(2-chloro-4-methylphenyl)-2-isopropylaminoethanol,
1-(2-chloro-5-methylphenyl)-2-isopropylaminoethanol,
1-(2-chloro-4-methylphenyl)-2-t-butylaminoethanol and
1-(2-chloro-4-methylphenyl)-2-(2-hydroxy-1,1-dimethylethyl)aminoethanol.

The salts of the invention may be for example salts derived from inorganic acids for example hydrochlorides, hydrobromides, phosphates or sulphates, or salts derived from organic acids for example oxalates, lactates, tartrates, acetates, salicylates and citrates.

According to a further feature of the invention we provide a process for the manufacture of the said benzene derivatives which comprises reaction of a compound of the formula:

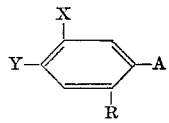

wherein R, X and Y have the meanings stated above and wherein A stands for the group

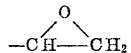

or for the group —CHOHCH$_2$Z wherein Z stands for a halogen atom, or mixtures of such compounds, with an amine of the formula NHR$^1$R$^2$ wherein R$^1$ and R$^2$ have the meanings stated above.

This process may be carried out in the presence of a diluent or solvent for example ethanol and it may be accelerated or completed by the application of heat.

The compound, or mixture of compounds, used as starting material may be obtained by reduction of the corresponding phenacyl halide by means of a metal hydride, for example sodium borohydride, in the presence of ethanol.

According to yet a further feature of the invention we provide a process for the manufacture of the benzene derivatives which comprises reduction of a compound of the formula:

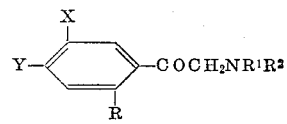

wherein R, R$^1$, R$^2$, X and Y have the meanings stated above, or a salt thereof.

The reduction process may be carried out for example by use of sodium borohydride as reducing agent in the presence of a diluent or solvent for example ethanol or aqueous methanol, or for example by use of a hydrogenation catalyst, for example platinum, or palladium on carbon, and hydrogen in the presence of an inert diluent or solvent, for example, ethanol or aqueous methanol.

According to a further feature of the invention we provide a process for the manufacture of the benzene derivatives wherein R$^1$ stands for hydrogen and R$^2$ has the meaning stated above which comprises reaction of a compound of the formula:

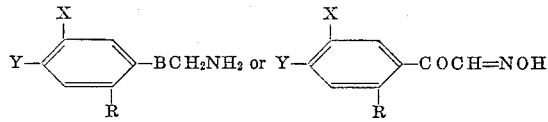

wherein R, X and Y have the meanings stated above and wherein B stands for the group —CO— or —CHOH—, under reducing conditions, with a carbonyl compound of the formula:

$$R^3R^4CO$$

wherein R$^3$ stands for hydrogen or for an alkyl radical and R$^4$ stands for an alkyl radical optionally substituted by an aryl radical or by one or more hydroxyl radicals.

It is to be understood that the compound of the formula:

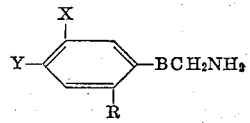

wherein R, X, Y and B have the meanings stated above, may be generated in situ from, for example, the compound of the formula:

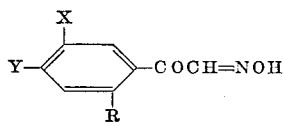

wherein R, X and Y have the meanings stated above and subsequently, or immediately, brought into reaction with the carbonyl compound of the formula:

$$R^3R^4CO$$

wherein $R^3$ and $R^4$ have the meanings stated above.

As suitable values of $R^3$ and $R^4$ there may be mentioned for example methyl, ethyl, propyl, butyl and phenethyl radicals.

The said reducing conditions may be for example reduction by means of catalytic hydrogenation for example hydrogenation in the presence of a platinum catalyst. The said catalytic hydrogenation may be carried out in the presence of an inert diluent or solvent for example ethanol and/or in an excess of the said carbonyl compound used as starting material for example acetone. The said catalytic hydrogenation may be carried out at atmospheric pressure or at elevated pressure and it may be carried out at ambient temperature or at an elevated temperature.

According to still a further feature of the invention we provide a process for the manufacture of the benzene derivatives which comprises reaction of a carbonyl compound of the formula:

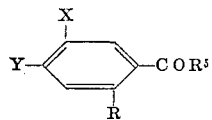

wherein R, X, and Y have the meanings stated above and $R^5$ stands for the aldehydo radical —CHO or for a radical of the formula $CH(OR^6)OR^7$ wherein $R^6$ and $R^7$, which may be the same or different, stand for hydrogen or for alkyl radicals, under reducing conditions, with an amine of the formula $HNR^1R^2$ wherein $R^1$ and $R^2$ have the meanings stated above, or a salt thereof.

The said reducing conditions may be for example reduction by means of catalytic hydrogenation, for example hydrogenation in the presence of a platinum catalyst. The said catalytic hydrogenation may be carried out in an inert diluent or solvent, for example ethanol. The said catalytic hydrogenation may be carried out at atmospheric pressure or at elevated pressure, and it may be carried out at ambient temperature or at an elevated temperature. The said reduction may alternatively be carried out by the use of sodium borohydride in an inert diluent or solvent, for example methanol or ethanol, at a temperature of about 0–25° C.

The compounds with which this invention is concerned possess valuable therapeutic properties for example they antagonise certain effects of adrenaline on heart muscle and are therefore of value in the treatment or prophylaxis of coronary artery disease.

Thus according to yet a further feature of the invention we provide pharmaceutical compositions containing as active ingredient one or more benzene derivatives of the formula:

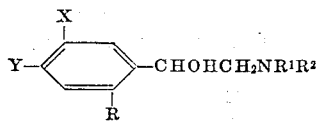

wherein R, $R^1$, $R^2$, X and Y have the meanings stated above, or a salt thereof, in admixture with non-toxic pharmaceutically-acceptable diluents or carriers therefor.

As suitable compositions there may be mentioned for example tablets, capsules, aqueous or oily solutions, aqueous or oily suspensions, emulsions, injectable aqueous or oily solutions or suspensions and dispersible powders.

The invention is illustrated but not limited by the following examples in which the parts are by weight:

Example 1

10 parts of a mixture of 1-(2-chloro-4-methylphenyl)-2-bromoethanol and (2-chloro-4-methylphenyl)ethylene oxide, prepared as described below, are dissolved in 180 parts of ethanol and the solution is heated under reflux with 18 parts of isopropylamine during 4 hours. The reaction mixture is then evaporated to dryness under reduced pressure and the oily residue is shaken with 50 parts of dilute aqueous hydrochloric acid. The mixture is extracted with 300 parts of ether, in three separate portions. The acidic aqueous layer is then made alkaline by the careful addition of 25 parts of 10 N-aqueous sodium hydroxide solution and the mixture is extracted with 300 parts of ether, in three separate portions. The ethereal extracts are combined, washed with 150 parts of water in three portions and dried over anhydrous sodium sulphate. The ethereal solution is then evaporated to dryness and there is thus obtained 1-(2-chloro-4-methylphenyl)-2-isopropylaminoethanol.

This product is dissolved in 100 parts of ether and ethereal hydrogen chloride is added gradually, with stirring, until a slight excess of hydrogen chloride is present. The mixture is filtered. The residual solid is crystallised from a mixture of ethanol and ethyl acetate and there is thus obtained 1-(2-chloro-4-methylphenyl)-2-isopropylaminoethanol hydrochloride, M.P. 172–174° C.

The mixture of 1-(2-chloro-4-methylphenyl)-2-bromoethanol and (2-chloro-4-methylphenyl)ethylene oxide used as starting material may be obtained as follows:

A solution of 10 parts of 2-chloro-4-methylphenacyl bromide in 125 parts of ethanol is stirred and 2 parts of sodium borohydride are added quickly, the temperature being kept below 25° C. The mixture is stirred at 10–20° C. for a further 30 minutes and is then poured on to ice. The aqueous mixture is carefully acidified by addition of acetic acid and is then extracted with ether. The ethereal extract is washed with 100 parts of saturated sodium bicarbonate solution in four portions, then with water and is dried over anhydrous sodium sulphate. The ethereal solution is evaporated to dryness thus providing a reduction product which consists of the desired mixture of 1-(2-chloro-4-methylphenyl)-2-bromoethanol and (2-chloro-4-methylphenyl)ethylene oxide.

Example 2

A solution of 4.5 parts of 2-chloro-4-methyl phenyl glyoxal in 80 parts of ethanol is treated with 8 parts of isopropylamine and the mixture is allowed to stand at 10–20° C. during 15 minutes. 1.5 parts of sodium borohydride are then added quickly, the temperature being kept below 25° C. The mixture is stirred at 10–20° C. for a further one hour and is then poured on to ice. The aqueous mixture is carefully acidified by addition of acetic acid followed by dilute hydrochloric acid, the acidic mixture is extracted with 300 parts of ether in three separate portions and the aqueous solution is retained. The combined ethereal extract is washed with dilute hydrochloric acid and the combined aqueous residual solution and acid washings are basified with 10 N-sodium hydroxide solution. The basic mixture is extracted with 300 parts of ether in three separate portions and the combined ethereal extracts are washed with water, dried over anhydrous sodium sulphate and evaporated to dryness. There is thus obtained 1-(2-chloro-4-methylphenyl)-2-isopropylaminoethanol. This product is dissolved in 50 parts of ether and a saturated ethereal hydrogen chloride solution is added gradually, with stirring and cooling, until a slight excess of hydrogen chloride is present. The mixture is filtered and the residual solid is crystallised from a mixture of ethanol and ethyl acetate. There is thus obtained 1-(2-chloro-4-methylphenyl)-2-isopropylaminoethanol hydrochloride, M.P. 172–174° C.

The 2-chloro-4-methylphenyl glyoxal used as starting material may be obtained as follows:

8.4 parts of 2-chloro-4-methylacetophenone are dissolved in a mixture of 50 parts of dioxan and 4 parts of water, and 5.5 parts of selenium dioxide are added. The mixture is stirred and heated at 90–100° C. during three hours. After cooling, the mixture is filtered and the filtrate is evaporated to dryness under reduced pressure. The residue is dissolved in 60 parts of ether and the ethereal solution is washed twice with 20 parts of saturated sodium bicarbonate solution, then with 20 parts of water, dried over anhydrous sodium sulphate and evaporated to dryness. The residue is distilled under reduced pressure and there is thus obtained 2-chloro-4-methylphenyl glyoxal B.P. 94–96° C./0.8 mm.

Example 3

A solution of 6 parts of 2-chloro-4-methylphenyl glyoxal in 100 parts of ethanol is treated with 10 parts of t-butylamine and is then reduced with 2 parts of sodium borohydride according to the process as described in Example 2, and the product is isolated in a similar manner. There is thus obtained 1-(2-chloro-4-methylphenyl)-2-t-butylaminoethanol. This product is dissolved in 50 parts of ether and stirred while a saturated ethereal solution of oxalic acid is added gradually until precipitation is complete. The mixture is filtered and the solid residue is crystallised from a mixture of acetone and methanol. There is thus obtained 1-(2-chloro-4-methylphenyl)-2-t-butylaminoethanol oxalate M.P. 245–246° C. with decomposition.

Example 4

A solution of 2.48 parts of 2-chloro-4-methylphenacyl bromide in 50 parts of dry ether is stirred and cooled to 0° C. while 1.46 parts of N-methyl isopropylamine are added dropwise. The mixture is stirred during one hour, allowed to stand during two hours and is then filtered and the filtrate is evaporated to dryness under reduced pressure. There is thus obtained 2-chloro-4-methylphenyl isopropylmethylaminomethyl ketone. This product is dissolved in 40 parts of ethanol and cooled to 0° C. The mixture is stirred and 0.8 part of sodium borohydride are added in small portions. The mixture is then stirred at 10–20° C. during a further hour, and the product is isolated by the process as described in Example 2. There is thus obtained 1-(2-chloro-4-methylphenyl)-2-isopropylmethylaminoethanol. This product is dissolved in 50 parts of ether and stirred while a saturated ethereal solution of hydrogen chloride is added dropwise until a slight excess of hydrogen chloride is present. The mixture is filtered and the solid residue is crystallised from a mixture of ethyl acetate and ethanol. There is thus obtained 1-(2-chloro-4-methylphenyl)-2-isopropylmethylaminoethanol hydrochloride, M.P. 169–170° C. with decomposition.

Example 5

A solution of 8 parts of 2-chloro-4-methylphenyl glyoxal in 100 parts of ethanol is treated with 2.4 parts of 2-amino-2-methylpropanol and the mixture is allowed to stand at 10–20° C. during 15 minutes. The mixture is then reduced with 1.5 parts of sodium borohydride according to the process as described in Example 2, and the product is isolated in a similar manner. There is thus obtained 1-(2-chloro-4-methylphenyl)-2-(2-hydroxy-1,1-dimethylethylamino)ethanol. This product is dissolved in 50 parts of ether and a saturated ethereal solution of oxalic acid is added gradually, with stirring, until precipitation is complete. The mixture is filtered and the residue is crystallised from 50% aqueous ethanol and there is thus obtained 1-(2-chloro-4-methylphenyl)-2-(2-hydroxy-1,1-dimethylethylamino)ethanol oxalate, M.P. 218–219° C. with decomposition.

Example 6

A solution of 1 part of benzylidene-acetone in 12 parts of ethanol is shaken in an atmosphere of hydrogen at ambient temperature and at a pressure of one atmosphere in the presence of 0.2 part of 5% palladium on charcoal catalyst until absorption of hydrogen ceases. 0.1 part of platinum oxide and a solution of 1 part of 2-chloro-4-methylphenyl hydroxyiminomethyl ketone in 16 parts of ethanol are added, and the mixture is shaken in an atmosphere of hydrogen at ambient temperature and at a pressure of one atmosphere until no more hydrogen is absorbed. The mixture is filtered and the filtrate is evaporated to dryness under reduced pressure. The crude product is shaken with 20 parts of ethyl acetate and filtered. The residue is recrystallised from ethyl acetate and there is thus obtained 1-(2-chloro-4-methylphenyl)-2-(1-methyl-3-phenylpropylamino)ethanol, M.P. 153–155° C.

The 2-chloro-4-methylphenyl hydroxyiminomethyl ketone used as starting material may be obtained as follows:

A solution of 16.8 parts of 2-chloro-4-methylacetophenone in 150 parts of saturated ethereal hydrogen chloride solution is stirred while 11.7 parts of amyl nitrite are added in small portions during one hour. The mixture is stirred during one further hour and is then poured into a stirred mixture of 500 parts of crushed ice and 250 parts of 2 N-sodium hydroxide solution. The ethereal layer is separated from the basic aqueous layer, both layers being retained. The ethereal layer is extracted repeatedly with portions of 25 parts of cold 2 N-sodium hydroxide solution until the extracts are almost colourless. The combined basic solution and extracts are cooled in ice and stirred while concentrated hydrochloric acid is carefully added until the pH of the solution is 3. This acidic solution is extracted three times with 80 parts of ether and the combined ethereal extracts are washed twice with 50 parts of water, dried over anhydrous sodium sulphate, and evaporated to dryness. The residue is crystallised from benzene and there is thus obtained 2-chloro-4-methylphenyl hydroxyiminomethyl ketone M.P. 142–143° C.

Example 7

To a solution of 8 parts of 1-(2-chloro-5-methylphenyl)-2-bromoethanol in 80 parts of ethanol are added 12 parts of isopropylamine. The mixture is heated under reflux during three hours and is then evaporated to dryness under reduced pressure. The product is isolated in a similar manner to that described in Example 1, and there is thus obtained 1-(2-chloro-5-methylphenyl)-2-isopropylaminoethanol, which after crystallization from petroleum ether (B.P. 60–80° C.), has M.P. 98–99° C.

The 1-(2-chloro-5-methylphenyl)-2-bromoethanol used as starting material may be obtained as follows:

A solution of 10 parts of 2-chloro-5-methylphenacyl bromide in 80 parts of ethanol is cooled to 10° C. and stirred while 2.5 parts of sodium borohydride are added in small portions so that the temperature remains below 20° C. Stirring is continued during a further 30 minutes and the mixture is then poured on to 200 parts of ice. Acetic acid is added dropwise until there is no further effervescence and the mixture is then extracted three times with 60 parts of ether. The combined ethereal extracts are washed twice with 50 parts of saturated sodium bicarbonate solution, once with 50 parts of water and then twice with 50 parts of brine. After drying over anhydrous sodium sulphate, the ethereal solution is evaporated to dryness and the residue is crystallised from petroleum ether (B.P. 60–80° C.). There is thus obtained 1-(2-chloro-5-methylphenyl)-2-bromoethanol, M.P. 87–88° C.

Example 8

A suspension of 0.05 part of platinum oxide in 16 parts of ethanol is shaken in an atmosphere of hydrogen at ambient temperature and at a pressure of one atmosphere until absorption of hydrogen ceases. A solution of 0.5 part of 2-chloro-4-methylphenyl hydroxyiminomethyl ketone in 10 parts of acetone is added and the mixture is shaken in an atmosphere of hydrogen at ambient temperature and at a pressure of one atmosphere until absorption of hydrogen ceases. The mixture is filtered and the filtrate is evaporated to dryness under reduced pressure. There is thus obtained 1-(2-chloro-4-methylphenyl)-2-isopropylaminoethanol. This product is dissolved in 10 parts of ether and the ethereal solution is stirred while a saturated ethereal solution of hydrogen chloride is added dropwise until a slight excess of hydrogen chloride is present. The mixture is filtered and the solid residue is crystallised from a mixture of ethyl acetate and ethanol. There is thus obtained 1-(2-chloro-4-methylphenyl)-2-isopropylaminoethanol hydrochloride, M.P. 172–174° C.

Example 9

A solution of 5 parts of 2-chloro-4-methoxyphenyl glyoxal in 80 parts of ethanol is treated with 8 parts of isopropylamine and the mixture is then subjected to reduction using 1.2 parts of sodium borohydride according to the process as described in Example 2. The product is isolated in a similar manner and there is thus obtained 1-(2-chloro-4-methoxyphenyl)-2-isopropylaminoethanol, which after crystallisation from petroleum ether (B.P. 60–80° C.), has M.P. 79–80° C.

The 1-chloro-4-methoxyphenyl glyoxal used as starting material may be obtained in the following manner:

5.5 parts of 2-chloro-4-methoxyacetophenone are dissolved in a mixture of 30 parts of dioxan and 1.5 parts of water, and 3.3 parts of selenium dioxide are added. The mixture is stirred and heated at 90–100° C. during four hours and is then cooled and filtered and the filtrate is evaporated to dryness under reduced pressure. The residue is dissolved in 50 parts of ethanol, filtered and evaporated to dryness under reduced pressure. There is thus obtained 2-chloro-4-methoxyphenyl glyoxal.

Example 10

A solution of 5.2 parts of 2-chloro-4-ethoxyphenyl glyoxal in 80 parts of ethanol is treated with 8 parts of isopropylamine and the mixture is then subjected to reduction using 1.2 parts of sodium borohydride according to the process as described in Example 2. The product is isolated in a similar manner, and there is thus obtained 1-(2-chloro-4-ethoxyphenyl)-2-isoproplyaminoethanol. This product is dissolved in 50 parts of ether and the solution is stirred while a saturated ethereal solution of hydrogen chloride is gradually added until a slight excess of hydrogen chloride is present. The mixture is filtered and the solid residue is crystallised from ethyl acetate. There is thus obtained 1-(2-chloro-4-ethoxyphenyl)-2-isopropylaminoethanol hydrochloride, M.P. 135–136° C. The 2-chloro-4-ethoxyphenyl glyoxal used as starting material may be obtained as follows:

5.9 parts of 2-chloro-4-ethoxyacetophenone are dissolved in a mixture of 35 parts of dioxan and 2 parts of water, and 3.3 parts of selenium dioxide are added. The mixture is stirred and heated at 90–100° C. during four hours. After cooling, the mixture is filtered and the filtrate is evaporated to dryness under reduced pressure. The residue is dissolved in 50 parts of ethanol, filtered and evaported to dryness under reduced pressure. There is thus obtained 2-chloro-4-methoxyphenyl glyoxal.

The 2-chloro-4-ethoxyacetophenone used as starting material may be obtained in the following manner:

A solution of 15.7 parts of 3-chlorophenetole in 50 parts of carbon disulphide is stirred while 16 parts of powdered anhydrous aluminium chloride is added. Stirring is continued and the mixture is cooled to 10° C. by means of an ice bath. 7.9 parts of acetyl chloride are added dropwise at such a rate that evolution of hydrogen chloride is gentle. The mixture is stirred at room temperature during thirty minutes and under gentle reflux during a further thirty minutes. The mixture is cooled and slowly poured into a mixture of 500 parts of crushed ice and 30 parts of concentrated hydrochloric acid. The acidic mixture is extracted three time with 60 parts of chloroform and the combined chloroform extracts are washed, twice with 50 parts of a 10% aqueous solution of sodium hydroxide, twice with 50 parts of water and dried over anhydrous magnesium sulphate. The chloroform is removed by distillation and the residue is distilled under reduced pressure. There is thus obtained 2-chloro-4-ethoxyacetophenone, B.P. 154–156° C./14 mm.

Example 11

A mixture of 50 parts of 1-(2-chloro-4-methylphenyl)-2-isopropylaminoethanol, 125 parts of maize starch, 270 parts of calcium phosphate and 1 part of magnesium stearate is compressed, and the compressed material is then broken down into granules by passage through a 16-mesh screen. The granules so obtained are then compressed into tablets according to the known art and there are thus obtained tablets containing from about 50 mgm. to about 750 mgm. of active ingredient which are suitable for oral use for therapeutic purposes.

The active ingredient may be replaced by 50 parts of 1-(2-chloro-5-methylphenyl) - 2 - isopropylaminoethanol, or by 50 parts of 1-(2-chloro-4-methylphenyl)-2-t-butylaminoethanol and there are likewise obtained tablets containing from about 50 mgm. to about 750 mgm. of active ingredient which are suitable for oral administration for therapeutic purposes.

Example 12

The following are typical formulations to provide tablets according to standard pharmaceutical techniques:

(i)

| | Mg. |
|---|---|
| 1-(2 - chloro-4-methylphenyl) - 2 - isopropylamino ethanol | 200 |
| Lactose | 400 |
| 10% aqueous gelatine solution | 9 |
| Maize starch | 35 |
| Magnesium stearate | 6 |

(ii)

| | |
|---|---|
| 1-(2 - chloro-4-methylphenyl) - 2 - isopropylamino ethanol | 100 |
| Lactose | 100 |
| Maize starch | 25 |
| Gelatine | 5 |
| Stearic acid | 2.5 |

(iii)

| | |
|---|---|
| 1-(2 - chloro-4-methylphenyl) - 2 - isopropylamino ethanol | 50 |
| Lactose | 150 |
| Maize starch | 25 |
| Talc | 5 |

The 1-(2-chloro-4-methylphenyl) - 2 - isopropylaminoethanol is mixed with an inert diluent (lactose) and is granulated with a binding agent (starch paste, gelatine solution or acacia mucilage). A distintegrating agent (maize starch or alginic acid) is mixed with the granules and there is then added thereto a lubricating agent (magnesium stearate, stearic acid or talc). The mixture is compressed into tablets according to the known art and there are obtained tablets containing from about 50 mgm. to about 750 mgm. of active ingredient and which are suitable for oral administration for therapeutic purposes.

What I claim is:
1. A compound selected from the group consisting of compounds of the formula:

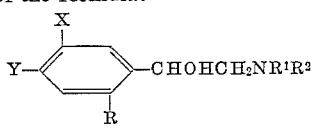

wherein R is selected from the group consisting of chlorine and bromine, one of the substituents X and Y is selected from the group consisting of hydrogen, lower alkyl and lower alkoxy and the other is selected from the group consisting of lower alkyl and lower alkoxy, $R^1$ is selected from the group consisting of hydrogen and methyl and $R^2$ is selected from the group consisting of lower alkyl containing at least two carbon atoms, hydroxy-substituted lower alkyl containing at least two carbon atoms, and the non-toxic pharmaceutically acceptable salts thereof.

2. 1 - (2-chloro-4-methylphenyl) - 2 - isopropylaminoethanol.

3. 1-(2 - chloro-5-methylphenyl) - 2 - isopropylaminoethanol.

4. 1-(2-chloro - 4 - methylphenyl)-2-t-butylaminoethanol.

5. 1-(2 - chloro-4-methylphenyl) - 2 - (2-hydroxy-1,1-dimethylethyl)aminoethanol.

References Cited by the Examiner
UNITED STATES PATENTS

| | | | |
|---|---|---|---|
| 1,767,423 | 6/1930 | Adams | 260—570.6 |
| 2,061,136 | 11/1936 | Bockmuhl et al. | 260—570.6 |
| 2,460,144 | 1/1949 | Moore et al. | 260—570.6 |
| 2,765,307 | 10/1956 | Schmidle | 260—570.6 X |
| 2,816,059 | 12/1957 | Mills | 260—570.6 X |
| 2,887,509 | 5/1959 | Nash. | |
| 2,900,415 | 8/1959 | Biel | 260—570.6 |
| 2,910,403 | 10/1959 | Brendel et al. | 167—65 |
| 2,938,921 | 5/1960 | Mills | 260—570.6 |
| 2,996,504 | 8/1961 | Zimmermann et al. | 260—570.6 X |
| 3,028,429 | 4/1962 | Wilbert et al. | 260—570.6 |
| 3,037,910 | 6/1962 | Copp et al. | 167—65 |
| 3,058,987 | 10/1962 | Albrecht et al. | |

FOREIGN PATENTS 570,892  2/1959  Canada.

OTHER REFERENCES

Lutz et al.: Jour. of Organic Chemistry, vol. 12, pp. 617–703 (1947).

Engelhardt et al.: Jour. Amer. Chem. Soc., vol. 72 pp. 2718–22 (1950).

Levy et al.: Jour. Pharm. Exptl. Therapy, vol. 130, pages 334–9 (1960).

Levy et al.: Jour. Pharm. Exptl. Therapy, vol. 133, pages 202–10 (1961).

Lucchesi et al.: Jour. Pharm. Exptl. Therapy, vol. 132, pages 372–81 (1961).

CHARLES B. PARKER, *Primary Examiner.*

WALTER A. MODANCE, *Examiner.*